(12) United States Patent
Oh et al.

(10) Patent No.: US 6,970,345 B2
(45) Date of Patent: Nov. 29, 2005

(54) SOLID ELECTROLYTIC CAPACITOR AND MANUFACTURING METHOD

(75) Inventors: Hyun Sub Oh, Kyungki-do (KR); Jae Kwang Kim, Kyungki-do (KR); Jae Jun Park, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 8 days.

(21) Appl. No.: 10/852,436

(22) Filed: May 25, 2004

(65) Prior Publication Data

US 2005/0105248 A1   May 19, 2005

(30) Foreign Application Priority Data

Nov. 14, 2003   (KR) .................... 10-2003-0080508

(51) Int. Cl.⁷ .................. H01G 4/228; H01G 9/145
(52) U.S. Cl. .................. 361/540; 361/528; 29/25.03
(58) Field of Search ................. 361/523, 528–529, 361/532–535, 537, 539, 540; 29/25.03

(56) References Cited

U.S. PATENT DOCUMENTS

| | | | |
|---|---|---|---|
| 4,097,915 A * | 6/1978 | Locke | 361/540 |
| 6,238,444 B1 * | 5/2001 | Cadwallader | 29/25.03 |
| 6,262,878 B1 | 7/2001 | Shirashige et al. | |
| 6,430,034 B2 * | 8/2002 | Sano et al. | 361/528 |
| 6,519,135 B2 * | 2/2003 | Sano et al. | 361/510 |
| 6,665,172 B1 * | 12/2003 | Kim et al. | 361/523 |
| 2003/0174460 A1 * | 9/2003 | Sano et al. | 361/523 |

* cited by examiner

*Primary Examiner*—Eric W. Thomas
(74) *Attorney, Agent, or Firm*—Lowe Hauptman & Berner, LLP

(57) ABSTRACT

Disclosed is a solid electrolytic capacitor, wherein a capacitor element has a front surface from which an anode lead wire is protruded. A cathode layer is formed on an outer surface of the capacitor element. A flat-shaped cathode lead frame is surface-contacted with an entire rear surface of the capacitor element. A flat-shaped anode lead frame has a concave portion formed at a central end portion thereof, in which the anode lead wire of the capacitor element is seated and electrically connected to the concave portion. A mold is formed to surround the capacitor element, to partially surround the anode lead frame, and to contact a face of the cathode lead frame which is surface-contacted with the capacitor element.

19 Claims, 6 Drawing Sheets

SOLID ELECTROLYTIC CAPACITOR AND MANUFACTURING METHOD

CROSS-REFERENCE TO RELATED APPLICATION

This application claims to benefit of Korea Patent application No. 2003-80508, filed Nov. 14, 2003.

BACKGROUND OF THE INVENTION

1. Field of the Invention

The present invention relates to a solid electrolytic capacitor and a manufacturing method thereof in which a volume efficiency is improved, and more particularly, to a solid electrolytic capacitor for improving a contact structure of a capacitor element and a lead frame such that the capacitor element has a greater volume to improve the volume efficiency.

2. Description of the Related Art

Generally, a solid electrolytic capacitor called a tantalum capacitor is widely used in an application circuit having a low rating voltage range as well as in a general industrial device, and in particular is widely used in a circuit in which a frequency characteristic is of question. Generally, the solid electrolytic capacitor is widely used to reduce a noise of a portable communication device.

As shown in FIG. 1, a conventional tantalum capacitor 100 includes a capacitor element 102 embedded into a case 112; an anode lead wire 108 integrally protruded from the capacitor element 102; an anode lead frame 104 welded to the anode lead wire 108 and protruded out of the case; and a cathode lead frame 114 being in contact with the capacitor element 102.

A method of manufacturing the capacitor 100 includes performing a press step for cuboid-shaping and sintering a dielectric powder; performing a chemical step for forming a dielectric coating film on an outer surface of the resultants; and dipping the resultants in an aqueous solution of manganese nitrate to form a solid-electrolytic manganese dioxide layer on an outer surface of the resultants by using thermal decomposition.

Recently, the tantalum capacitor 100 is widely used in a miniaturized device to be in a tendency of gradual miniaturization comparing to the conventional art. If the capacitor 100 is miniaturized, contact portions of the capacitor element 102 and lead frames 104 and 114 occupy much space to cause the tantalum element 102 to be small-sized relatively. As a result, the conventional tantalum capacitor has a drawback in that the capacitor element has a small volume efficiency to reduce capacitance and increase impedance.

Further, since the lead frame is required to be much limited in reduction of a size itself so as to firmly fix the lead frame inserted into the case, the lead frame inserted into the case should be much limited in size reduction. That is, it is required to firmly fix the lead frame by molding; if the lead frame is excessively reduced in size, there is a drawback in that the lead frame is not firmly fixed.

FIG. 2 illustrates the tantalum capacitor for increasing the volume efficiency of the capacitor element by improving the contacting method of the lead frame. FIG. 2 relates to U.S. Pat. No. 6,262,878 entitled as "Chip Capacitor".

In FIG. 2, the capacitor element 200 has a cathode layer 220 on its outer surface, and has an anode lead wire 240 protruded from its body. Further, on one lower end of the cathode layer is formed a flat-shaped cathode lead frame 210 parallel with and electrically connected with the cathode layer, and on the other lower end of the cathode layer is formed a flat-shaped anode lead frame 230 electrically connected with an anode connection member 234.

The conventional chip capacitor is constructed to arrange the lead frames on a lower surface of a chip so as to increase the volume efficiency of the capacitor element of the chip, and to connect the lead frame with an external terminal. However, the above structured chip capacitor can achieve an advantageous increase of the volume efficiency, whereas has a drawback generated when the chip is mounted.

In other words, since the chip has the terminal only at the lower surface thereof, the chip does not have the terminal at the side surface thereof. Accordingly, at the time of soldering, the conventional chip capacitor has a drawback in that the contact area between the solder and the terminal is not formed normally. The solder 270 is bonded to the chip in a shape as in FIG. 3. The solder 270 is used to bond the cathode lead frame 210 disposed on the lower surface of the solid electrolytic capacitor to a substrate 290, and most of the solder 270 is bonded to the side surface of the chip. This causes unreliability in the electrical connection of the chip and the substrate.

SUMMARY OF THE INVENTION

Accordingly, the present invention is directed to a solid electrolytic capacitor and a manufacturing method thereof that substantially obviate one or more problems due to limitations and disadvantages of the related art.

An object of the present invention is to provide a solid electrolytic capacitor for improving a contact structure of a capacitor element and a lead frame such that the capacitor element has greater volume efficiency to achieve an enough electrostatic capacitance though being miniaturized.

Another object of the present invention is to provide a solid electrolytic capacitor and a manufacturing method thereof in which great volume efficiency can be secured while reliability can be guaranteed when a chip is mounted, and mass production can be more easily performed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a solid electrolytic capacitor including: a capacitor element having a front surface from which an anode lead wire is protruded, and an outer surface on which a cathode layer is formed; a flat-shaped cathode lead frame surface-contacted with an entire rear surface of the capacitor element; a flat-shaped anode lead frame having a concave portion formed at a central end portion thereof such that the anode lead wire of the capacitor element is seated in and is electrically connected to the concave portion; and a mold formed to surround the capacitor element, to partially surround the anode lead frame, and to contact a face of the cathode lead frame which is surface-contacted with the capacitor element. In accordance with an aspect of the present invention, the mold is filled between the cathode lead frame and the anode lead frame to protect the capacitor element, the mold covering the capacitor element and contacting a face of the cathode lead frame surface-contacted with the capacitor element.

Preferably, the cathode lead frame includes a first surface and a second surface parallel to the first surface, and the entire rear surface of the capacitor element is bonded to the first surface. Further, it is desirable that the outer surface of the mold is coplanar with a side surface of the cathode lead frame.

It is desirable that the first surface of the cathode lead frame includes a position-fixing surface concaved in the same size as the rear surface of the capacitor element to seat the rear surface of the capacitor element in a right position. At this time, a connection surface slanting at a predetermined angle can be formed at an interface of the position-fixing surface and the first surface of the cathode lead frame.

Further, preferably, the anode lead frame and the anode lead wire are bonded using laser welding, and it is desirable that the cathode lead frame and the rear surface of the capacitor element are bonded using a conductive adhesive.

In another aspect of the present invention, there is provided a manufacturing method of a solid electrolytic capacitor, the method including the steps of: providing a tantalum-powder sintering pellet having a front surface from which an anode lead wire is protruded, and an outer surface on which a cathode layer is formed; forming a plurality of flat-shaped cathode lead frames and a plurality of flat-shaped anode lead frames vertically onto a base plate, the flat-shaped cathode lead frame having a size for enabling the rear surface of the sintering pellet to be bonded thereto, the flat-shaped anode lead frame having a concave portion formed at a central end portion thereof to seat the anode lead wire of the sintering pellet therein; bonding the rear surface of the sintering pellet through a conductive adhesive to the cathode lead frame disposed on the base plate; bonding the anode lead frame with the anode lead wire by welding; forming a mold to surround the sintering pellet, to partially surround the anode lead frame, and to contact a face of the cathode lead frame which is surface-contacted with the capacitor element; and separating the cathode lead frame and the anode lead frame from the base plate. In accordance with an aspect of the present invention, the mold is filled between the cathode lead frame and the anode lead frame to protect the capacitor element, the mold covering the capacitor element and contacting a face of the cathode lead frame surface-contacted with the capacitor element.

Preferably, the cathode lead frame has a position-fixing surface concaved in the same size as the rear surface of the sintering pellet to seat the rear surface of the sintering pellet in a right position. Further, preferably, the rear surface of the sintering pellet is bonded to the position-fixing surface of the cathode lead frame by using the conductive adhesive.

Further, preferably, the anode lead frame and the anode lead wire are bonded using laser welding, and the outer surface of the mold is coplanar with a side surface of the cathode lead frame.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 4:
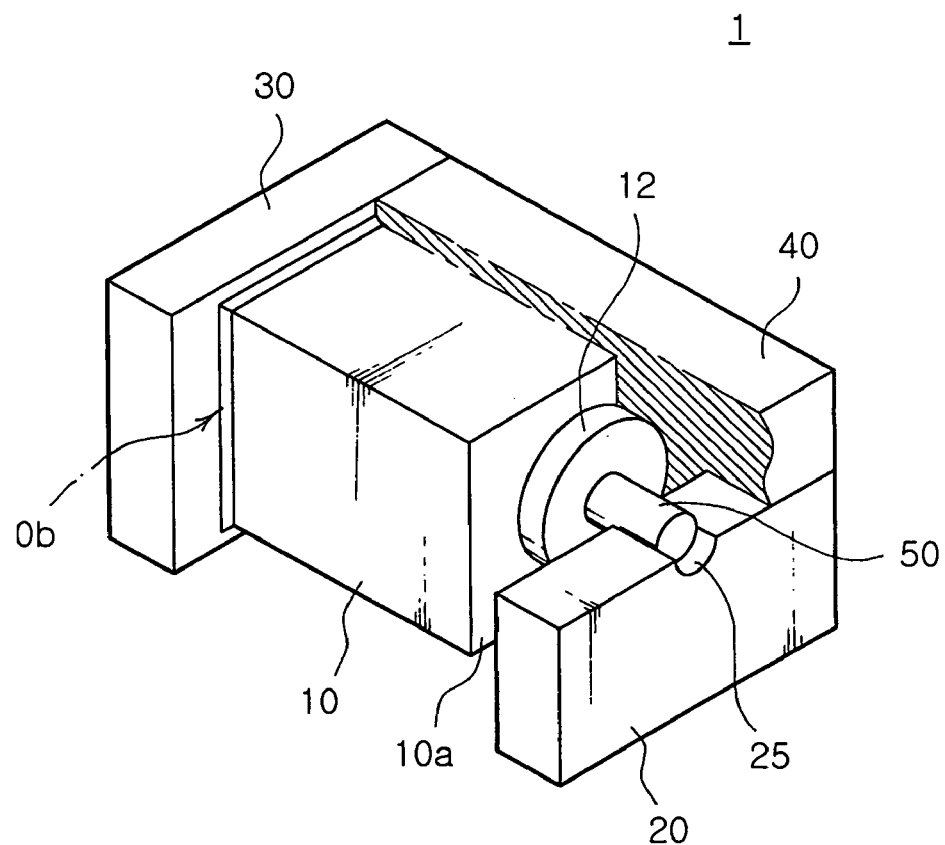
FIG. 4 is a perspective section view illustrating an internal structure of a solid electrolytic capacitor according to a preferred embodiment of the present invention.
Figure 5:
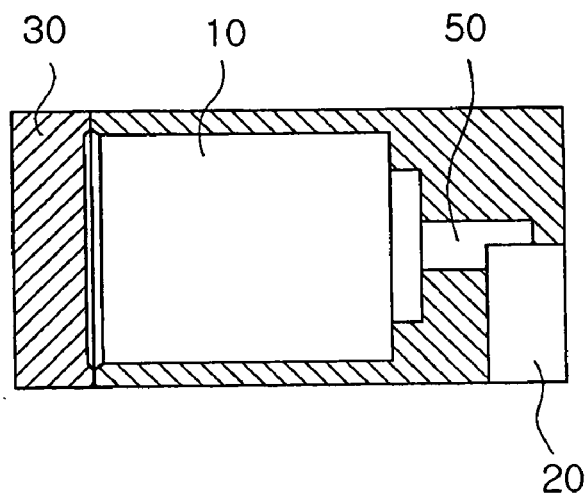
FIG. 5 is a section view illustrating a capacitor of FIG. 4.

FIG. 4 is a perspective section view illustrating an internal structure of a solid electrolytic capacitor according to a preferred embodiment of the present invention, and FIG. 5 is a section view illustrating the capacitor of FIG. 4.

The inventive solid electrolytic capacitor includes a capacitor element 10. The capacitor element 10 is a dielectric element manufactured by compressing and shaping a tantalum oxide ($Ta_2O_5$) powder in a cuboid-shape. The dielectric element is not limited to tantalum (Ta), but can be also selectively formed of other materials such as a niobium (Nb) oxide.

The capacitor element 10 is formed in a rectangular column-shape. The capacitor element 10 includes a front surface 10a having an anode lead wire protruded therefrom, and a rear surface 10b disposed at an opposite side to the front surface 10a. A cathode layer is formed on an outer surface of the capacitor element 10. In order to prevent the cathode layer from being formed at a peripheral portion of the anode lead wire 50 on the front surface of the capacitor element 10, a disc-shaped cap 12 is fitted and bonded to the wire 50.

A plate-shaped cathode lead frame 30 is bonded to the rear surface of the capacitor element 10. The cathode lead frame 30 is flat-shaped not having a bent portion, and is surface-contacted with the entire rear surface of the capacitor element 10. The cathode lead frame 30 is so sized that a corner portion thereof is protruded beyond a corner portion of the capacitor element 10. Accordingly, it is desirable that the lead frame 30 is protruded outward of the capacitor element 10 at a predetermined length when the capacitor element 10 is bonded to the cathode lead frame 30. It is desirable that the capacitor element 10 and the cathode lead frame 30 are adhered to each other by a conductive adhesive. This is to allow a current to be supplied through the cathode lead frame 30.

A conventional capacitor is constructed such that the above cathode lead frame is bent at and bonded to a side surface of the capacitor element, or is bonded only to a bottom surface. However, a conventional method of connecting the capacitor element with the cathode lead frame has a drawback in that the capacitor element has low volume efficiency, and connection failure is frequently generated to an external substrate. Accordingly, in order to improve this drawback, the present invention is characterized in that the cathode lead frame is flat-shaped in parallel with and on the entire rear surface of the capacitor element.

Figure 6:
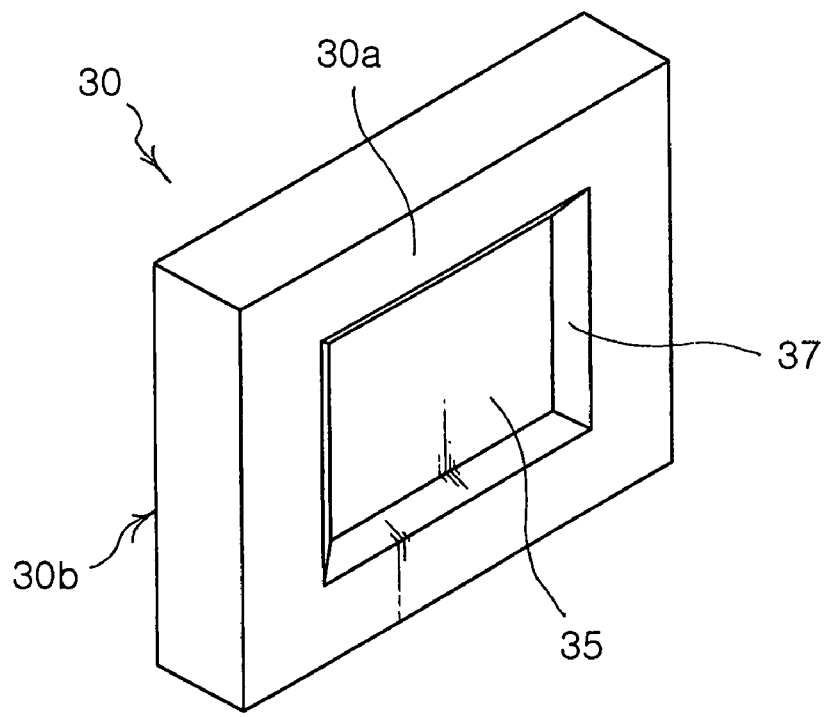
FIG. 6 is a perspective view illustrating a cathode lead frame of a capacitor of FIG. 4.

FIG. 6 is a perspective view illustrating a cathode lead frame of the solid electrolytic capacitor.

The cathode lead frame 30 includes a first surface 30a being in contact with the rear surface of the capacitor element 10, and a second surface 30b disposed at an opposite side to the first surface. A position-fixing surface 35 is concavely formed on the first surface 30a in the same size as the rear surface 10b of the capacitor element 10. The position-fixing surface 35 functions to seat the rear surface of the capacitor element in a right position. The rear surface of the capacitor element 10 is inserted into and seated in the position-fixing surface 35. Preferably, a connection surface 37 slanting at a predetermined angle is formed at an interface of the position-fixing surface 35 and the first surface 30a. The rear surface of the capacitor element 10 is slid into and seated in the position-fixing surface 35 through the connection surface 37.

On the other hand, the anode lead wire 50 disposed on the front surface of the capacitor element 10 according to the present invention is vertically connected with the anode lead frame 20 disposed in parallel with the front surface of the capacitor element 10. The anode lead wire 50 protruded from the front surface of the capacitor element 10 is made of for example tantalum. The anode lead wire 50 is protruded frontward at a predetermined length to be electrically connected with the anode lead frame 20. The anode lead frame 20 is disposed along a surface being parallel to the front surface of the capacitor element 10. The anode lead frame 20 has a concave portion 25 formed at a central upper end portion thereof to seat the anode lead wire 50 therein.

Figure 7:
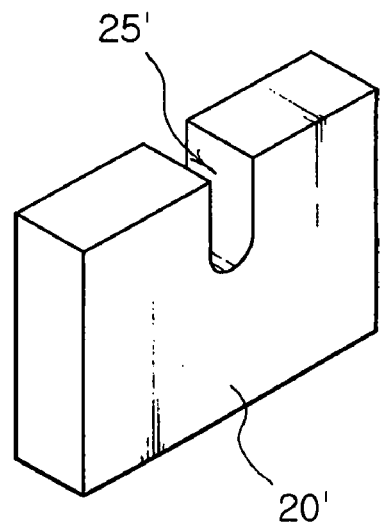
FIG. 7 is a view illustrating a modified example of an anode lead frame of a capacitor of FIG. 4.

The concave portion 25 is preferably formed in a semicircular shape to seat the anode lead wire therein, and can be formed in a rectangular groove shape. Further, the concave portion 25 of the anode lead frame 20 can be formed in a long slit shape. FIG. 7 is a view illustrating a modified example of the anode lead frame 20. As shown in FIG. 7, an anode lead frame 20' has a concave portion 25' shaped in a downward extending slit.

The anode lead frame 20 and the cathode lead wire 50 are connected to each other by welding. That is, after the wire 50 is seated in the anode lead frame 20, laser welding is performed on an upper surface of the anode lead frame 20 to melt and connect the anode lead frame 20 with the wire 50. Further, it is desirable that the anode lead frame 20 is formed of a metal material such as iron having a lower melting point than a material of the anode lead wire 50. This causes a portion of a vertical surface of the anode lead frame 20 to be melted by a heat source irradiated to the anode lead frame 20 corresponding to a front end of the anode lead wire 50. The molten frame can allow the anode lead wire 50 and the anode lead frame 20 facing with each other to be connected simply and conveniently.

Accordingly, the front end of the anode lead wire 50 and the anode lead frame 20 are directly connected using the molten frame without a welding base-material such as Pb. Accordingly, the connection failure melting or opening the welding base-material due to a high temperature generated can be prevented when a product set employing the inventive capacitor is used.

After the capacitor element 10 are connected with the anode lead frame 20 and the cathode lead frame 30 as shown in FIG. 4, a mold 40 is formed of a resin material such as epoxy. As shown in FIGS. 4 and 5, the mold 40 is formed to surround the capacitor element 10, to partially surround the anode lead frame 20, and to contact a face of the cathode lead frame 30 which is surface-contacted with the capacitor element 10. As best seen in FIGS. 4–5, the mold 40 in this embodiment is filled between the cathode lead frame 30 and the anode lead frame 20 to protect the capacitor element 10. The mold 40 also covers the capacitor element 10 and contacts a face, i.e. the front face, of the cathode lead frame 30 surface-contacted with the capacitor element 10. The mold 40 is formed to have an outer surface being coplanar with a side surface of the cathode lead frame 30. This is to allow the side surface of the lead frame to be connected to a main substrate (not shown). Further, the mold 40 is formed to have the outer surface being coplanar with the outer surface of the anode lead frame 20. That is, the outer surfaces of the anode lead frame, the cathode lead frame and the mold form a rectangular box-shaped structure.

Figure 1:
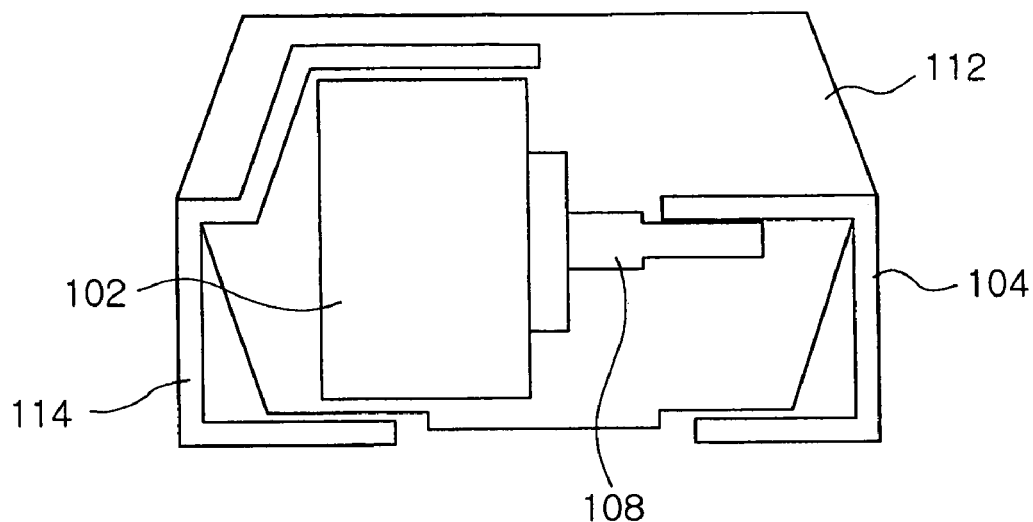
FIG. 1 is a section view illustrating a structure of a conventional solid electrolytic capacitor.
Figure 2:
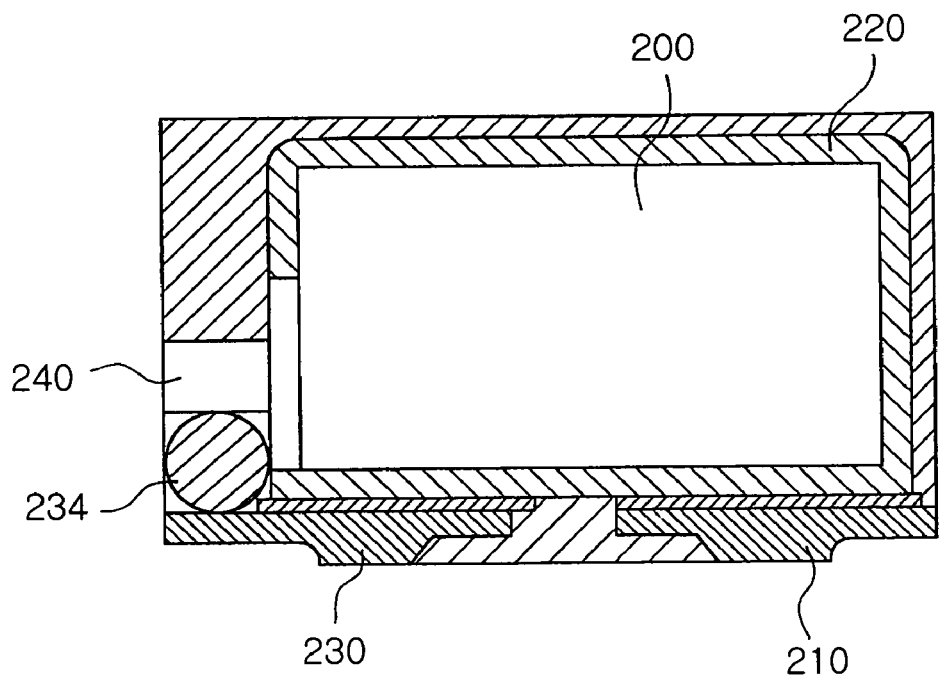
FIG. 2 is a section view illustrating a conventional another solid electrolytic capacitor.
Figure 3:
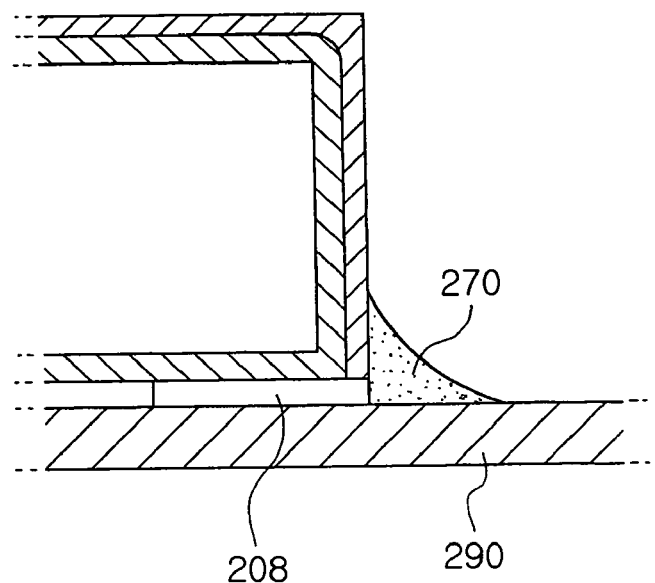
FIG. 3 is a section view for depicting a drawback of a mounted solid electrolytic capacitor of FIG. 2.

In case that the shape of the cathode lead frame according to the present invention is used, the following advantages can be achieved. That is, a bent portion within the capacitor element can be reduced in comparison with the conventional structure as in FIG. 1, and the contact area of the lead frame and the capacitor element can be increased. This construction is to increase a volume ratio of the capacitor element to the total chip in a tendency of gradual miniaturization of the capacitor chip to increase a capacity of a capacitor chip. Accordingly, if the structure according to the present invention is employed, the volume efficiency is increased as in the following Table 1.

TABLE 1

| | | Height (mm) | Width (mm) | Length (mm) | Volume (mm³) | Volume efficiency (%) |
|---|---|---|---|---|---|---|
| Chip size | | 0.55 | 0.60 | 1.05 | 0.347 | — |
| Size of capacitor element | Conventional | 0.30 | 0.45 | 0.40 | 0.054 | 15.6 |
| | Present invention | 0.45 | 0.45 | 0.55 | 0.111 | 32.1 |

Table 1 compares cases to which the conventional structure and the inventive structure of the capacitor chip having a 1.0×0.5 size are applied. It can confirm that the size of the capacitor element embedded in the same-sized chip is increased comparing to the conventional art. The conventional art has 15.6%, but the present invention has 32.1% in the volume efficiency, that is, the ratio of the capacitor element volume to the total chip volume. Accordingly, the present invention can achieve an approximately double increase effect in volume.

This result can be achieved by eliminating the contact structure of the cathode lead frame 30 and the side surface of the capacitor element 10 to extend the capacitor element 10 close to the outer surface of the mold 40, and also by eliminating the bent structure of the cathode lead frame 30 by extending the capacitor element 10 up to the rear surface of the chip.

Further, in the present invention, the cathode lead frame 30 is not only bonded to the entire rear surface of the capacitor element 10, but also the anode lead frame 20 stands vertically to be connected with the anode lead wire 50 such that the capacitor element 10 can be a little more extended frontward.

Figure 8:
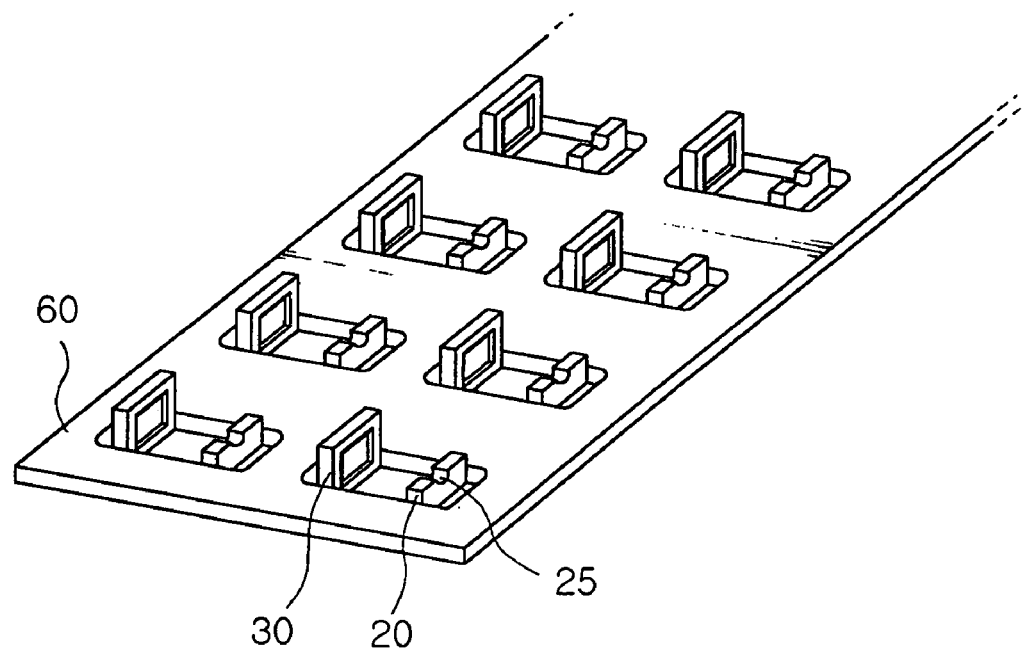
FIG. 8 is a view illustrating a step of manufacturing a lead frame in a manufacturing process of a solid electrolytic capacitor according to a preferred embodiment of the present invention.
Figure 9:
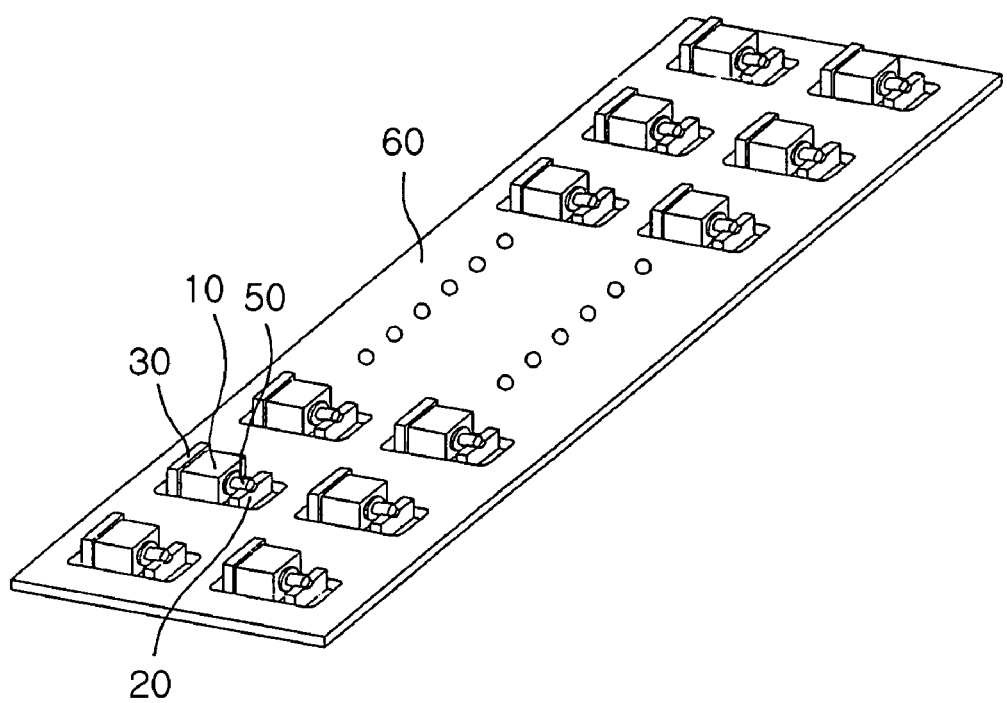
FIG. 9 is a view illustrating a capacitor element mounting step in a manufacturing process of a solid electrolytic capacitor according to a preferred embodiment of the present invention.
Figure 10:
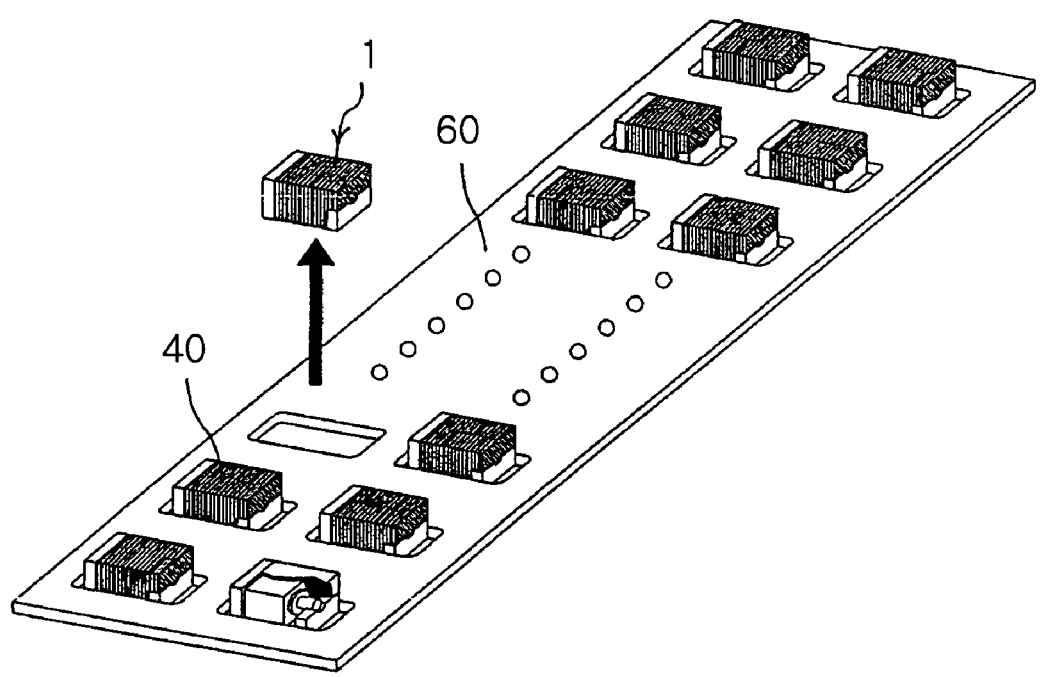
FIG. 10 is a view illustrating a mold-forming and a chip-separating steps after a mounting step of FIG. 9 in a manufacturing process of a solid electrolytic capacitor according to a preferred embodiment of the present invention.

A manufacturing method of the solid electrolytic capacitor is hereinafter described according to the present invention. FIG. 8 is a view illustrating a lead frame-forming step in a manufacturing process of the solid electrolytic capacitor according to a preferred embodiment of the present invention. FIG. 9 is a view illustrating a capacitor-element mounting step, and FIG. 10 is a view illustrating a mold-forming and chip-separating step after the mounting step of FIG. 9.

Firstly, as shown in FIGS. 4 and 5, the capacitor element 10 is provided to have the front surface from which the anode lead wire 50 is protruded, and have the outer surface on which the cathode layer is formed. As aforementioned, the capacitor element 10 is rectangular box-shaped, and it can be formed of the tantalum powder and is constructed to have the front surface from which the anode lead wire 50 is protruded.

The capacitor element 10 includes the front surface from which the anode lead wire 50 is protruded, and the rear surface disposed at the opposite side to the front surface, and has the rear surface to which the cathode lead frame 30 is bonded. For this, as shown in FIG. 8, a plurality of the cathode lead frames 30 and the anode lead frames 20 are formed on a base plate 60.

Firstly, the cathode lead frame 30 is rectangular flat-shaped greater than the rear surface of the capacitor element 10. The anode lead frame 20 is processed to have the concave portion 25 for seating the anode lead wire 50 of the capacitor element 10. The lead frames 20 and 30 are formed vertically to the base plate 60.

Next, the prepared capacitor element 10 is mounted on the base plate 60 for which the lead frames 20 and 30 are provided. That is, the rear surface of the capacitor element 10 is adhered to the cathode lead frame 30 on the base plate 60. At this time, after the conductive adhesive is coated on the cathode lead frame 30, the rear surface of the capacitor element 10 is bonded to the cathode lead frame 30 through the coated adhesive. FIG. 9 illustrates a state in which the capacitor element 10 is bonded to the cathode lead frame 30.

Herein, the position-fixing surface 35 is formed on the surface (first surface) of the cathode lead frame 30 to be bonded with the capacitor element 10. The position-fixing surface 35 is formed concavely to have the same size as the rear surface of the capacitor element 10. The position-fixing surface 35 allows the capacitor element 10 to be always seated in the right position, and allows an assembly process of the capacitor element 10 to be easily performed.

The anode lead wire 50 of the capacitor element 10 is bonded, by welding, placed on the concave portion of the anode lead frame 20. Specifically, it is desirable that the anode lead frame 20 is melted, using laser welding, to fixedly surround the lead wire 50 for electrical connection.

As shown in FIG. 9, after the capacitor element 10 is bonded to the lead frames 20 and 30, the mold 40 functioning as an encapsulation case is formed in a rectangular space provided by the lead frames. After the mold 40 is formed, the lead frames are separated from the base plate 60 to complete the solid electrolytic capacitor chip according to the present invention.

As described above, the present invention has an effect in which the contact structure of the capacitor element and the lead frame is improved to provide greater internal volume efficiency such that the electrostatic capacitance is provided enough in comparison with the conventional art.

Further, the present invention has an effect in which the connection reliability can be guaranteed at the time of chip mounting since the cathode lead frame is flat-shaped to have a surface-contact with the entire rear surface of the capacitor element, and the flat-shaped cathode lead frame is formed vertically to the substrate to have a sufficient contact area with the solder when the chip is mounted.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A solid electrolytic capacitor, comprising:
   a capacitor element having a front surface from which an anode lead wire is protruded, and an outer surface on which a cathode layer is formed;
   a flat-shaped cathode lead frame surface-contacted with an entire rear surface of the capacitor element;
   a flat-shaped anode lead frame having a concave portion formed at a central end portion thereof such that the anode lead wire of the capacitor element is seated in and is electrically connected to the concave portion; and
   a mold formed between the cathode lead frame and the anode lead frame to protect the capacitor element, the mold covering the capacitor element and contacting a face of the cathode lead frame which is surface-contacted with the capacitor element.

2. The capacitor of claim 1, wherein the cathode lead frame comprises a first surface and a second surface parallel to the first surface, and the entire rear surface of the capacitor element is bonded to the first surface.

3. The capacitor of claim 2, wherein the outer surface of the mold is coplanar with a side surface of the cathode lead frame.

4. The capacitor of claim 2, wherein the first surface of the cathode lead frame comprises a position-fixing surface concaved in the same size as the rear surface of the capacitor element to seat the rear surface of the capacitor element in a right position.

5. The capacitor of claim 4, wherein a connection surface slanting at a predetermined angle is formed at an interface of the position-fixing surface and the first surface of the cathode lead frame.

6. The capacitor of claim 1, wherein the anode lead frame and the anode lead wire are bonded by laser welding.

7. The capacitor of claim 1, wherein the cathode lead frame and the rear surface of the capacitor element are bonded using a conductive adhesive.

8. A manufacturing method of a solid electrolytic capacitor, the method comprising the steps of:
   providing a tantalum-powder capacitor element having a front surface from which an anode lead wire is protruded, and an outer surface on which a cathode layer is formed;
   forming a plurality of flat-shaped cathode lead frames and a plurality of flat-shaped anode lead frames vertically onto a base plate, the flat-shaped cathode lead frame having a size for enabling a rear surface of the capacitor element to be bonded thereto, the flat-shaped anode lead frame having a concave portion formed at a central end portion thereof to seat the anode lead wire of the capacitor element therein;

bonding the rear surface of the capacitor element through a conductive adhesive to the cathode lead frame disposed on the base plate;

bonding the anode lead frame with the anode lead wire by welding;

forming a mold between the cathode lead frame and the anode lead frame to protect the capacitor element, the mold covering the capacitor element and contacting a face of the cathode lead frame which is surface-contacted with the capacitor element; and separating the cathode lead frame and the anode lead frame from the base plate.

9. The method of claim 8, wherein the cathode lead frame has a position-fixing surface concaved in the same size as the rear surface of the capacitor element to seat the rear surface of the capacitor element in a right position.

10. The method of claim 9, wherein the rear surface of the capacitor element is bonded to the position-fixing surface of the cathode lead frame by using the conductive adhesive.

11. The method of claim 8, wherein the anode lead frame and the anode lead wire are bonded by laser welding.

12. The method of claim 8, wherein the outer surface of the mold is coplanar with a side surface of the cathode lead frame.

13. A solid electrolytic capacitor, comprising:

a capacitor element having a front surface from which an anode lead wire is protruded, and an outer surface on which a cathode layer is formed;

a flat-shaped cathode lead frame surface-contacted with an entire rear surface of the capacitor element;

a flat-shaped anode lead frame having a concave portion formed at a central end portion thereof such that the anode lead wire of the capacitor element is seated in and is electrically connected to the concave portion; and a mold formed to surround the capacitor element, to partially surround the anode lead frame, and to contact a face of the cathode lead frame which is surface-contacted with the capacitor element.

14. The capacitor of claim 13, wherein the cathode lead frame comprises a first surface and a second surface parallel to the first surface, and the entire rear surface of the capacitor element is bonded to the first surface.

15. The capacitor of claim 14, wherein the outer surface of the mold is coplanar with a side surface of the cathode lead frame.

16. The capacitor of claim 14, wherein the first surface of the cathode lead frame comprises a position-fixing surface concaved in the same size as the rear surface of the capacitor element to seat the rear surface of the capacitor element in a right position.

17. The capacitor of claim 16, wherein a connection surface slanting at a predetermined angle is formed at an interface of the position-fixing surface and the first surface of the cathode lead frame.

18. The capacitor of claim 13, wherein the anode lead frame and the anode lead wire are bonded by laser welding.

19. The capacitor of claim 13, wherein the cathode lead frame and the rear surface of the capacitor element are bonded using a conductive adhesive.

* * * * *